US012647937B2

(12) United States Patent
Reddy et al.

(10) Patent No.: US 12,647,937 B2
(45) Date of Patent: Jun. 2, 2026

(54) SIGNAL STRENGTH BASED POSITIONING WITH CARRIER FREQUENCY INFORMATION

(71) Applicant: QUALCOMM Incorporated, San Diego, CA (US)

(72) Inventors: Varun Amar Reddy, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 289 days.

(21) Appl. No.: 18/444,005

(22) Filed: Feb. 16, 2024

(65) Prior Publication Data
US 2025/0267624 A1     Aug. 21, 2025

(51) Int. Cl.
| | |
|---|---|
| *H04W 84/12* | (2009.01) |
| *H04B 17/318* | (2015.01) |
| *H04W 40/24* | (2009.01) |
| *H04W 64/00* | (2009.01) |
| *H04W 40/20* | (2009.01) |
| *H04W 40/34* | (2009.01) |

(52) U.S. Cl.
CPC ........ *H04W 64/006* (2013.01); *H04B 17/328* (2023.05); *H04W 84/12* (2013.01)

(58) Field of Classification Search
None
See application file for complete search history.

(56) References Cited

U.S. PATENT DOCUMENTS

| | | | | |
|---|---|---|---|---|
| 10,659,919 B1 * | 5/2020 | Li | | H04B 17/318 |
| 2017/0234978 A1 * | 8/2017 | Shvodian | | G01S 11/06 |
| | | | | 455/522 |
| 2021/0314901 A1 | 10/2021 | Issakov et al. | | |
| 2022/0394653 A1 * | 12/2022 | Chang | | H04W 64/00 |
| 2023/0006790 A1 | 1/2023 | Manolakos et al. | | |
| 2024/0129895 A1 * | 4/2024 | Rune | | H04B 7/18534 |
| 2025/0071716 A1 * | 2/2025 | Hirzallah | | G01S 5/0221 |
| 2025/0274733 A1 * | 8/2025 | Fan | | H04W 4/02 |

FOREIGN PATENT DOCUMENTS

| | | | | |
|---|---|---|---|---|
| CN | 107305247 A | * 10/2017 | | G01S 5/021 |
| WO | 2022200673 A1 | 9/2022 | | |

OTHER PUBLICATIONS

International Search Report and Written Opinion—PCT/US2024/057286—ISA/EPO—Jun. 18, 2025.
Partial International Search Report—PCT/US2024/057286—ISA/EPO—Apr. 14, 2025.

* cited by examiner

*Primary Examiner* — Venkat Perungavoor
(74) *Attorney, Agent, or Firm* — QUALCOMM Incorporated

(57) ABSTRACT
Techniques are provided for positioning wireless devices such as user equipment (UEs), access points (APs), asset tags, and other wireless devices. An example method for estimating a position based on measured signal strength values includes obtaining signal strength values for a plurality of positioning signals, determining one or more offset values based at least in part on respective frequencies of the plurality of positioning signals, and estimating the position based on the signal strength values and the one or more offset values.

30 Claims, 16 Drawing Sheets

830

| | RSSI | StationID | Frequency/channel | Location | Tx Pwr | | |
|---|---|---|---|---|---|---|---|
| | 801 | 802 | 804 | 806 | 808 | | |
| | Value1 | Sta1 | 2.4GHz | Location 1 | P1 | → | Offset 1  834a |
| | Value2 | Sta2 | 2.4GHz | Location 2 | P2 | → | Offset 2  834b |
| | Value3 | Sta3 | 2.4GHz | Location 2 | P3 | | Offset 3  834c |
| | Value4 | Sta4 | 2.4GHz | Location 3 | P3 | | 832 |

| Frequency/channel | Offset |
|---|---|
| frequency A | 6 dB |
| frequency B | 2 dB |
| frequency C | 3 dB |
| frequency D | 4 dB |
| ... | ... |
| frequency N | n dB |

722 724

720

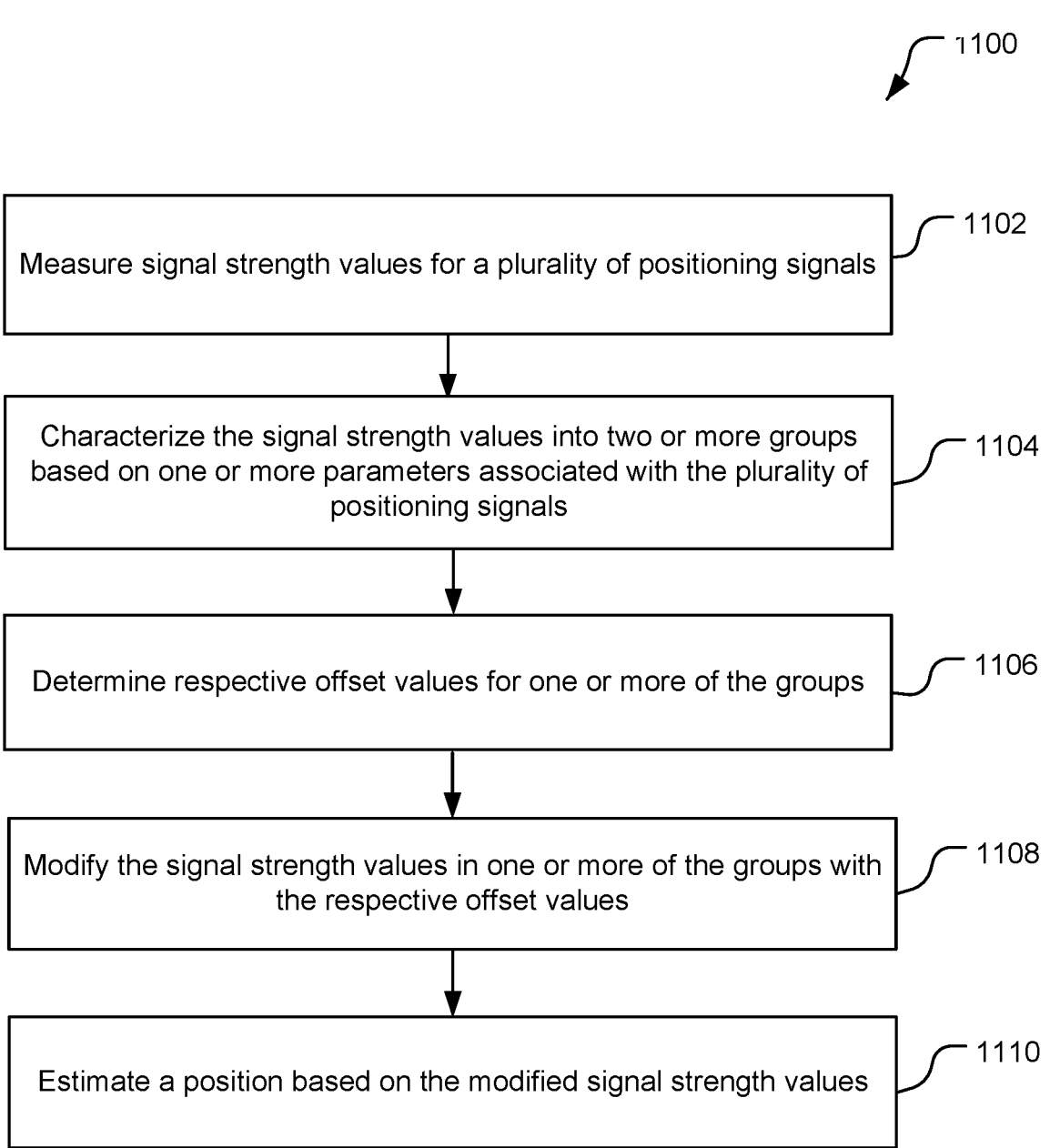

1100

Measure signal strength values for a plurality of positioning signals ⌐1102

Characterize the signal strength values into two or more groups based on one or more parameters associated with the plurality of positioning signals ⌐1104

Determine respective offset values for one or more of the groups ⌐1106

Modify the signal strength values in one or more of the groups with the respective offset values ⌐1108

Estimate a position based on the modified signal strength values ⌐1110

*FIG. 11*

SIGNAL STRENGTH BASED POSITIONING WITH CARRIER FREQUENCY INFORMATION

BACKGROUND

The use of wireless devices for many everyday activities is becoming common. Modern wireless devices may make use of one or more wireless communication technologies. For example, a wireless device may communicate using a short range communication technology such as WiFi technology, Bluetooth® technology, ultrawideband (UWB) technology, millimeter wave (mmWave) technology, etc. The use of short range communication technologies, such as WiFi and Bluetooth®, in wireless devices has become much more common in the last several years and is regularly used in retail businesses, offices, homes, cars, manufacturing operations, and public gathering places. Access points may be installed to enable data communication between wireless devices and a network. Some access points may enable access to the Internet. Short range communication technologies may be used in ranging and radio frequency sensing operations. The use of access points in ranging and positioning applications, however, is often limited because the accuracy of some positioning measurements may be limited.

SUMMARY

An example method for estimating a position based on measured signal strength values according to the disclosure includes obtaining signal strength values for a plurality of positioning signals, determining one or more offset values based at least in part on respective frequencies of the plurality of positioning signals, and estimating the position based on the signal strength values and the one or more offset values.

An example method for characterizing signal strength measurements and determining a position estimate according to the disclosure includes measuring signal strength values for a plurality of positioning signals, characterizing the signal strength values into two or more groups based on one or more parameters associated with the plurality of positioning signals, determining respective offset values for one or more of the groups, modifying the signal strength values in one or more of the groups with the respective offset values, and estimating a position based on the modified signal strength values.

An example apparatus according to the disclosure includes at least one memory, at least one transceiver, at least one processor communicatively coupled to the at least one memory and the at least one transceiver, and configured to: obtain signal strength values for a plurality of positioning signals, determine one or more offset values associated with the plurality of positioning signals, and estimate a position based on the signal strength values and the one or more offset values.

An example apparatus according to the disclosure includes at least one memory, at least one transceiver, at least one processor communicatively coupled to the at least one memory and the at least one transceiver, and configured to: measure signal strength values for a plurality of positioning signals, characterize the signal strength values into two or more groups based on one or more parameters associated with the plurality of positioning signals, determine respective offset values for one or more of the groups, modify the signal strength values in one or more of the groups with the respective offset values, and estimate a position based on the modified signal strength values.

Items and/or techniques described herein may provide one or more of the following capabilities, as well as other capabilities not mentioned. Stations in a wireless network may transmit positioning signals. Mobile devices and other wireless nodes may be configured to obtain signal strength measurements for the positioning signals and determine position estimates based on the signal strength measurements. Offset values may be applied to the signal strength measurements to improve the accuracy of the position estimates. The offset values may be based on a carrier frequency, free-path loss computations, statistical channel models and/or derived models. The offset values may be based on the topology of the stations. The mobile devices may receive assistance data including offset values or other information to enable the computation of offset values. The accuracy of position estimates based on signal strength measurements may be improved. Other capabilities may be provided and not every implementation according to the disclosure must provide any, let alone all, of the capabilities discussed.

BRIEF DESCRIPTION OF THE DRAWINGS

FIG. 11 is a process flow diagram of an example method for characterizing signal strength measurements and determining a position estimate.

DETAILED DESCRIPTION

Figure 1:
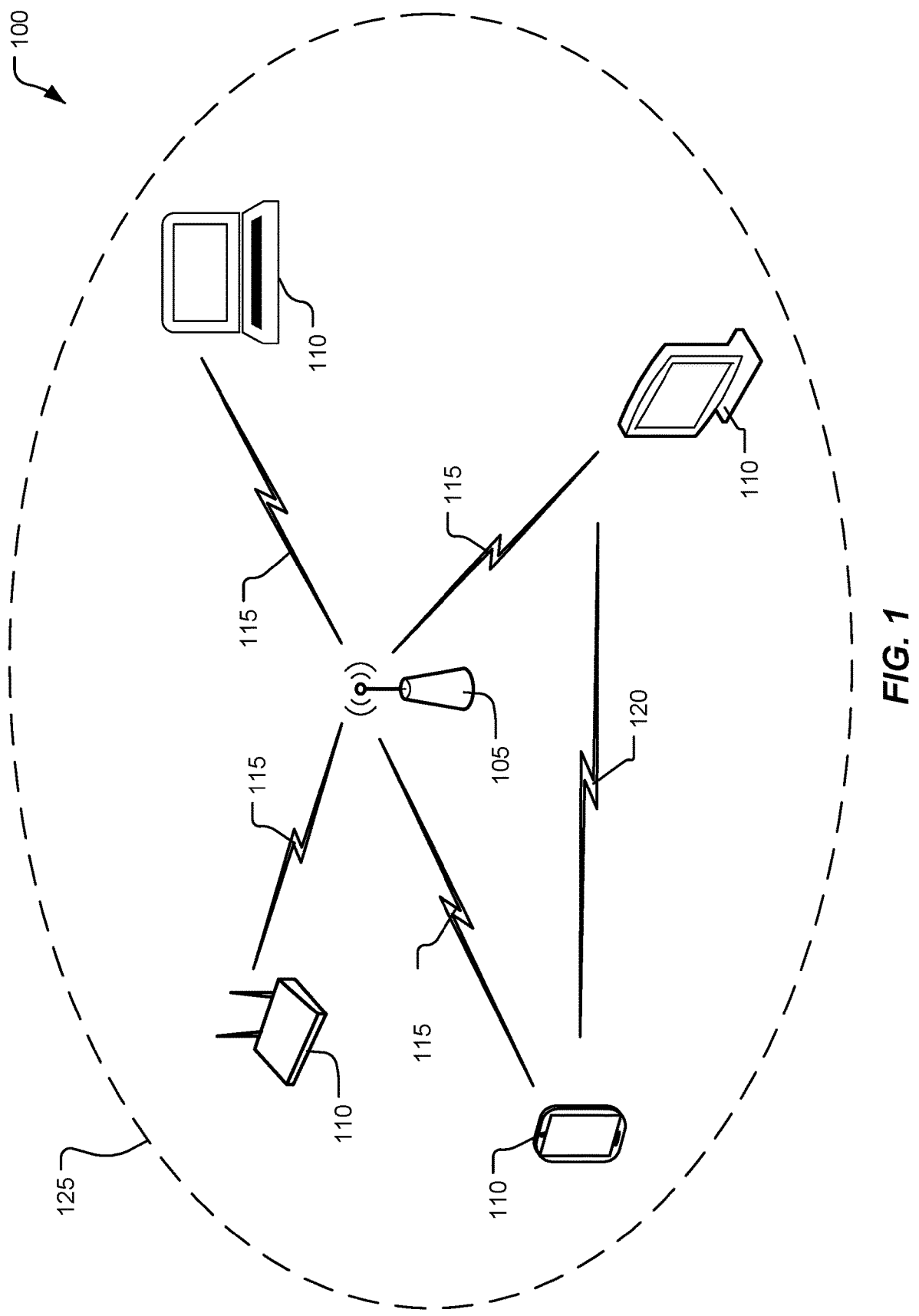
FIG. 1 is a diagram of an example wireless local area network (WLAN).

Techniques are discussed herein for positioning wireless devices such as user equipment (UEs), access points (APs), asset tags, and other wireless devices. Wireless devices may be configured to determine a range between the devices based on measuring the signal strength of received radio frequency (RF) signals. Cellular, WiFi, Bluetooth®, Bluetooth® Low Energy (BLE), sidelink, ultrawideband (UWB), and other wireless technologies may utilize received signal strength indicator (RSSI) values to determine the relative distance between stations. Other ranging techniques may also be used, however, RSSI may be a preferred method in many use cases. For example, a wireless device may be a low-cost device (e.g., asset tag, RedCap UE, etc.) and may lack the capabilities to obtain more complex measurements such as time of arrival (ToA) and angle of arrival (AoA) which may require additional hardware and/or advanced processing capabilities. In some networks, the network stations (e.g., legacy WiFi APs) may not support two-way ranging using ToA measurements and thus may utilize RSSI measurements for positioning operations.

In general, RSSI-based positioning may yield low accuracies as compared to more complex techniques such as ToA. The position accuracy may be further reduced when the distance between the stations is increased. For example, in large indoor areas such as warehouses and large retail areas, the APs may be over 25 m apart from one another. Base stations in wide area networks may have even larger distances between the stations which may further exacerbate the decreased position accuracy.

Although being a low-complexity approach, RSSI-based positioning typically yields lower accuracies, that are proportional to the density of anchor nodes. Hence, in large stores and warehouses, where APs tend to be far apart (25-30 m), accuracy tends to be low. This effect is exacerbated in macro-scenarios where gNBs are several hundreds of meters apart. Further, the reference signals may be transmitted over different channels and may undergo different levels of attenuation. As a result, a mobile device may obtain non-uniform RSSI measurements which may further reduce the accuracy.

The techniques provided herein may be implemented to improve the position accuracy of RSSI measurements with the use of offset values which are applied to the RSSI measurements. In an example, a RSSI offset may be applied to the measured RSSI based on the carrier frequency of the positioning reference signal (or beacon). The offset may be based on a free-path loss, a statistical channel model and/or a derived model. A RSSI offset may be based on prior knowledge of the AP topology and associated capability information, such as the carrier frequency that is supported. RSSI offset values may be applied based on other parameters associated with the reference signals and the AP topology. In an example, a mobile device may receive assistance data from a network server that indicates offset information, such as how to calculate offset values and/or offset threshold values.

Particular aspects of the subject matter described in this disclosure may be implemented to realize one or more of the following potential advantages. The accuracy of position estimates based on signal strength measurements may be increased. Location estimates for low complexity devices (e.g., reduced capability, asset tags, etc.) and legacy APs may be improved. Signaling overhead (e.g., over-the-air messages) for device positioning may be reduced. Other advantages may also be realized.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, a block diagram illustrates an example of a WLAN network 100 such as, e.g., a network implementing IEEE 802.11 and IEEE 802.15 families of standards. The WLAN network 100 may include an access point (AP) 105 and one or more wireless devices 110 or stations (STAs) 110, such as mobile stations, head mounted devices (HMDs), personal digital assistants (PDAs), asset tracking devices, other handheld devices, netbooks, notebook computers, tablet computers, laptops, display devices (e.g., TVs, computer monitors, etc.), printers, IoT devices, asset tags, key fobs, vehicles, etc. The AP 105 and the wireless devices 110 may be WiFi, Bluetooth®, and/or UWB capable devices. While one AP 105 is illustrated, the WLAN network 100 may have multiple APs 105. Each of the wireless devices 110, which may also be referred to as mobile stations (MSs), mobile devices, access terminals (ATs), user equipment(s) (UE), wireless nodes, wireless devices, subscriber stations (SSs), or subscriber units, may associate and communicate with an AP 105 via a communication link 115. Each AP 105 has a geographic coverage area 125 such that wireless devices 110 within that area can typically communicate with the AP 105. The wireless devices 110 may be dispersed throughout the geographic coverage area 125. Each wireless device 110 may be stationary or mobile.

A wireless device 110 can be covered by more than one AP 105 and can therefore associate with one or more APs 105 at different times. A single AP 105 and an associated set of stations may be referred to as a basic service set (BSS). An extended service set (ESS) is a set of connected BSSs. A distribution system (DS) is used to connect APs 105 in an extended service set. A geographic coverage area 125 for an access point 105 may be divided into sectors making up a portion of the coverage area. The WLAN network 100 may include access points 105 of different types (e.g., metropolitan area, home network, etc.), with varying sizes of coverage areas and overlapping coverage areas for different technologies. In other examples, other wireless devices can communicate with the AP 105.

While the wireless devices 110 may communicate with each other through the AP 105 using communication links 115, each wireless device 110 may also communicate directly with one or more other wireless devices 110 via a direct wireless link 120. Two or more wireless devices 110 may communicate via a direct wireless link 120 when both wireless devices 110 are in the AP geographic coverage area 125 or when one or neither wireless device 110 is within the AP geographic coverage area 125. Examples of direct wireless links 120 may include WiFi Direct connections, connections established by using a WiFi Tunneled Direct Link Setup (TDLS) link, 5G-NR sidelink, PC5, UWB, Bluetooth®, and other P2P group connections. The wireless devices 110 in these examples may communicate according to the WLAN radio and baseband protocol including physical and MAC layers from IEEE 802.11 and IEEE 802.15, and their various versions. For example, the one or more of the wireless devices 110 and the AP 105 may be configured to utilize WiFi, Bluetooth®, and/or UWB signals for communications and/or positioning applications.

Figure 2:
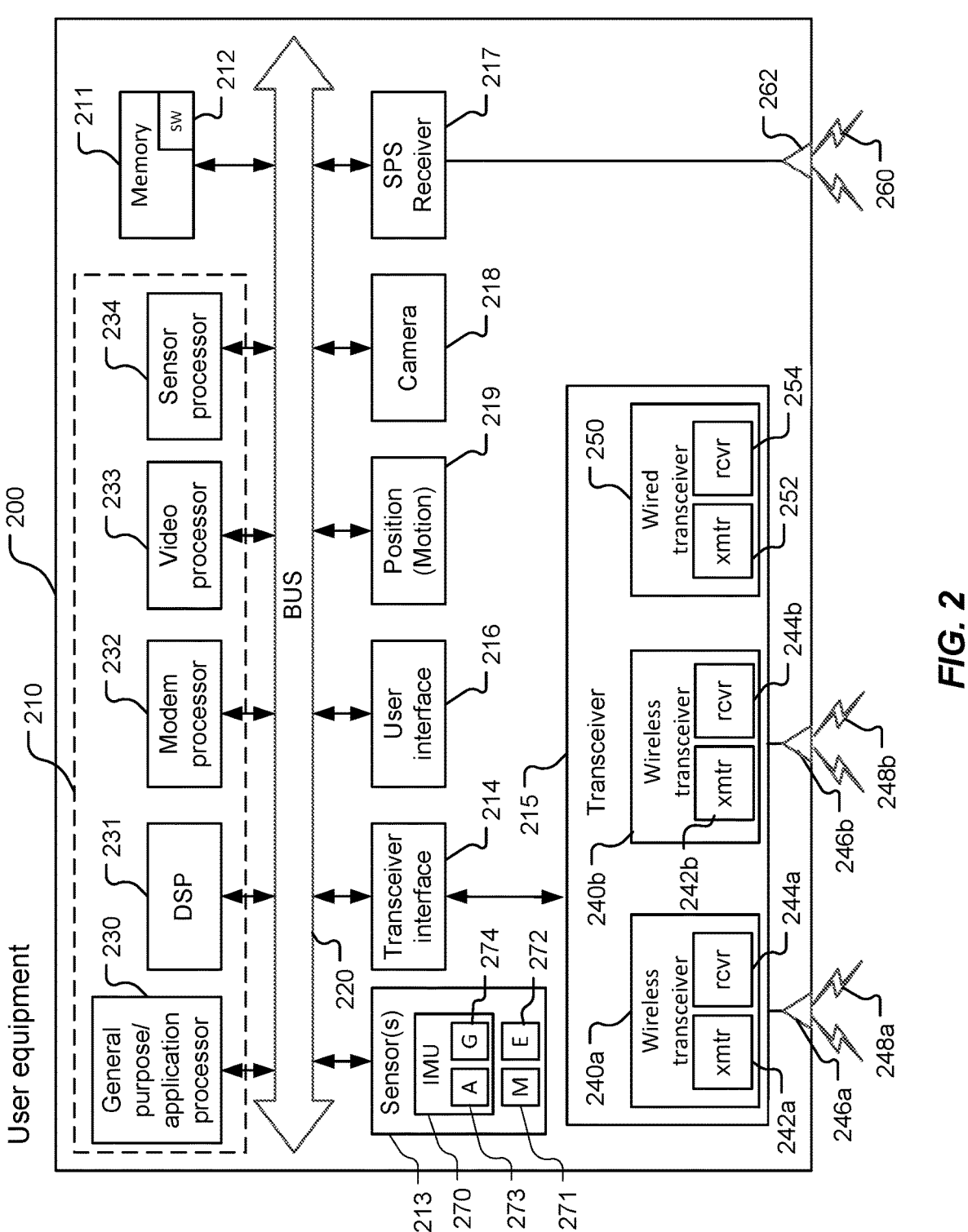
FIG. 2 is a block diagram of components of an example wireless device or user equipment.

Referring also to FIG. 2, a UE 200 is an example of the wireless devices 110 and comprises a computing platform including a processor 210, memory 211 including software (SW) 212, one or more sensors 213, a transceiver interface 214 for a transceiver 215 (including one or more wireless transceivers such as a first wireless transceiver 240a, a second wireless transceiver 240b, and optionally a wired transceiver 250), a user interface 216, a Satellite Positioning System (SPS) receiver 217, a camera 218, and a position (motion) device 219. The processor 210, the memory 211, the sensor(s) 213, the transceiver interface 214, the user interface 216, the SPS receiver 217, the camera 218, and the position (motion) device 219 may be communicatively coupled to each other by a bus 220 (which may be configured, e.g., for optical and/or electrical communication). One or more of the shown apparatuses (e.g., the camera 218, the position (motion) device 219, and/or one or more of the sensor(s) 213, etc.) may be omitted from the UE 200. The processor 210 may include one or more hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radio frequency (RF) sensing and ultrasound. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software (which may also include firmware) 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceivers 240a-b. Other example configurations include one or more of the processors 230-234 of the processor 210, the memory 211, the wireless transceivers 240a-b, and one or more of the sensor(s) 213, the user interface 216, the SPS receiver 217, the camera 218, the PMD 219, and/or the wired transceiver 250. Other configurations may not include all of the components of the UE 200. For example, an IoT device may include more wireless transceivers 240a-b, the memory 211 and a general-purpose processor 230. A multi-link device may simultaneously utilize the first wireless transceiver 240a on a first link using a first frequency band, and the second wireless transceiver 240b on a second link using a second frequency band. Additional transceivers may also be used for additional links and frequency bands and radio access technologies.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise one or more inertial sensors, for example, one or more accelerometers 273 (e.g., collectively responding to acceleration of the UE 200 in three dimensions) and/or one or more gyroscopes 274. The magnetometer(s) may provide measurements to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile. In another example, for relative positioning information, the sensors/IMU can be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) 273 and gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) 271 may include a two-dimensional magnetometer configured to detect and provide indications of magnetic field strength in two orthogonal dimensions. Also or alternatively, the magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the processor 210.

The transceiver 215 may include wireless transceivers 240a-b and a wired transceiver 250 configured to communicate with other devices through wireless connections and wired connections, respectively. In an example, each of the wireless transceivers 240a-b may include respective transmitters 242a-b and receivers 244a-b coupled to one or more respective antennas 246a-b for transmitting and/or receiving wireless signals 248a-b and transducing signals from the wireless signals 248a-b to wired (e.g., electrical and/or optical) signals and from wired (e.g., electrical and/or optical) signals to the wireless signals 248a-b. Thus, the transmitters 242a-b may be the same transmitter, or may include multiple transmitters that may be discrete components or combined/integrated components, and/or the receivers 244a-b may be the same receiver, or may include multiple receivers that may be discrete components or combined/integrated components. The wireless transceivers 240a-b may be configured to communicate signals (e.g., with access points and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11ax and 802.11be), WiFi, WiFi Direct (WiFi-D), Bluetooth®, IEEE 802.15 (UWB), Zigbee etc. The wireless transceivers 240a-b may be configured to obtain signal strength measurements for RF signals associated with one or more RATS. The wired transceiver 250 may include a transmitter 252 and a receiver 254 configured for wired communication. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216. In an example, the user interface 216 may include one or more biometric sensors configured to obtain biometric information from a user. For example, the biometric sensors may include a fingerprint capture device, a microphone (for voice input), the camera 218 (e.g., for facial recognition, iris detection), a display (e.g., for finger swipe recognition) or other such sensors. The IMU 270 may be configured to obtain motion data to determine biometric information such as the user's gait or step length. Other sensors in the UE 200 may also be used to obtain biometric information from a user.

The SPS receiver 217 (e.g., a Global Positioning System (GPS) receiver) may be capable of receiving and acquiring SPS signals 260 via an SPS antenna 262. The antenna 262 is configured to transduce the SPS signals 260 to wired signals, e.g., electrical or optical signals, and may be integrated with one or more of the antennas 246a-b. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceivers 240a-b) for use in performing positioning operations. For example, the positioning operations may be based on RSSI measurements. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position (motion) device (PMD) 219 may be configured to determine a position and possibly motion of the UE 200. For example, the PMD 219 may communicate with, and/or include some or all of, the SPS receiver 217. The PMD 219 may also or alternatively be configured to determine location of the UE 200 using terrestrial-based signals (e.g., at least some of the wireless signals 248a-b) for trilateration or mulilateration, for assistance with obtaining and using the SPS signals 260, or both. The PMD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PMD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose processor 230 and/or the DSP 231) may be configured to use to determine motion (e.g., a velocity vector and/or an acceleration vector) of the UE 200. The PMD 219 may be configured to provide indications of uncertainty and/or error in the determined position and/or motion. In an example the PMD 219 may be referred to as a Positioning Engine (PE), and may be performed by the general-purpose processor 230. For example, the PMD 219 may be a logical entity and may be integrated with the general-purpose processor 230 and the memory 211.

Figure 3:
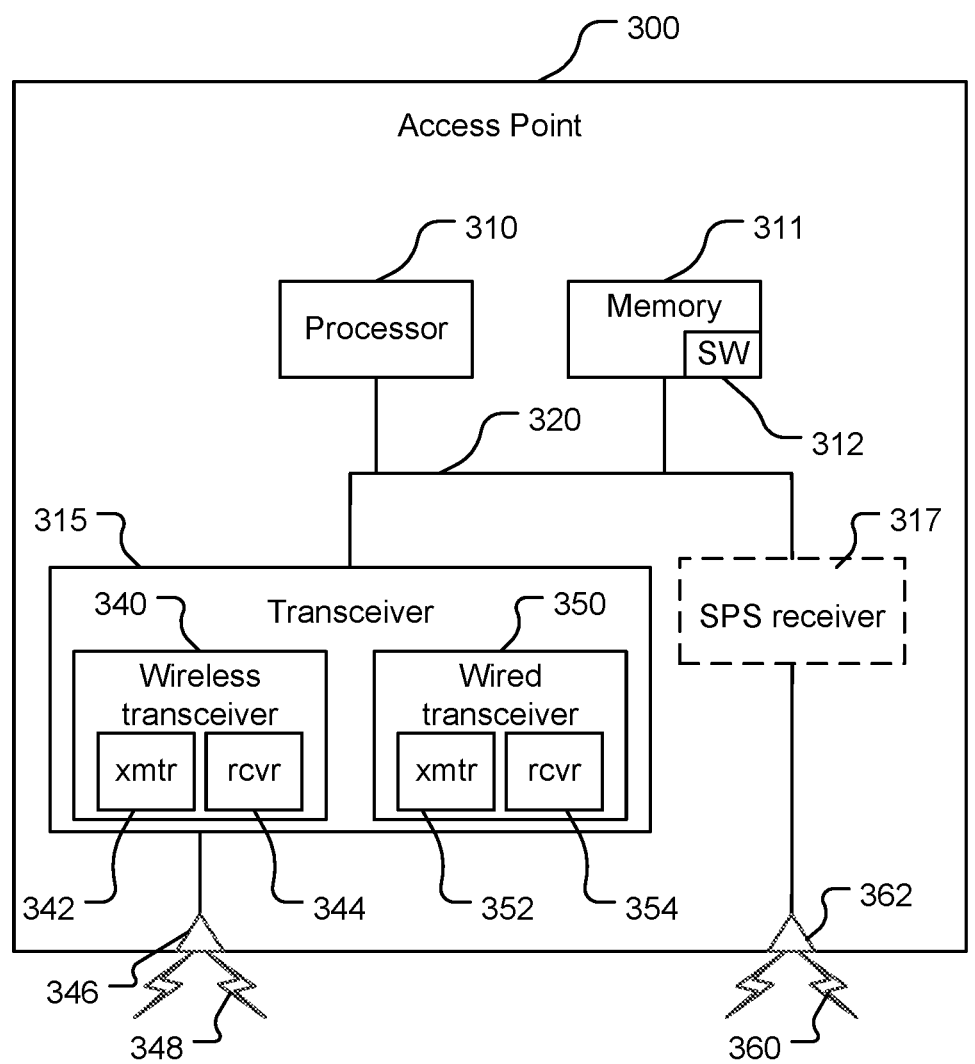
FIG. 3 is a block diagram of components of an example access point.

Referring also to FIG. 3, an example of an access point (AP) 300 such as the AP 105 comprises a computing platform including a processor 310, memory 311 including software (SW) 312, a transceiver 315, and (optionally) an SPS receiver 317. The processor 310, the memory 311, the transceiver 315, and the SPS receiver 317 may be communicatively coupled to each other by a bus 320 (which may be configured, e.g., for optical and/or electrical communication). One or more of the shown apparatuses (e.g., a wireless interface and/or the SPS receiver 317) may be omitted from the AP 300. The SPS receiver 317 may be configured similarly to the SPS receiver 217 to be capable of receiving and acquiring SPS signals 360 via an SPS antenna 362. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer to the processor 310 performing a function, but this includes other implementations such as where the processor 310 executes software and/or firmware. The description may refer to the processor 310 performing a function as shorthand for one or more of the processors contained in the processor 310 performing the function. The processor 310 may include a memory with stored instructions in addition to and/or instead of the memory 311. Functionality of the processor 310 is discussed more fully below.

The transceiver 315 may include a wireless transceiver 340 and a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink channels) and/or receiving (e.g., on one or more downlink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as IEEE 802.11 (including IEEE 802.11ax and 802.11bc), WiFi, WiFi Direct (WiFi-D), Bluetooth®, IEEE 802.15 (UWB), Zigbee etc. The wired transceiver 350 may include a transmitter 352 and a receiver 354 configured for wired communication. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication.

Figure 4:
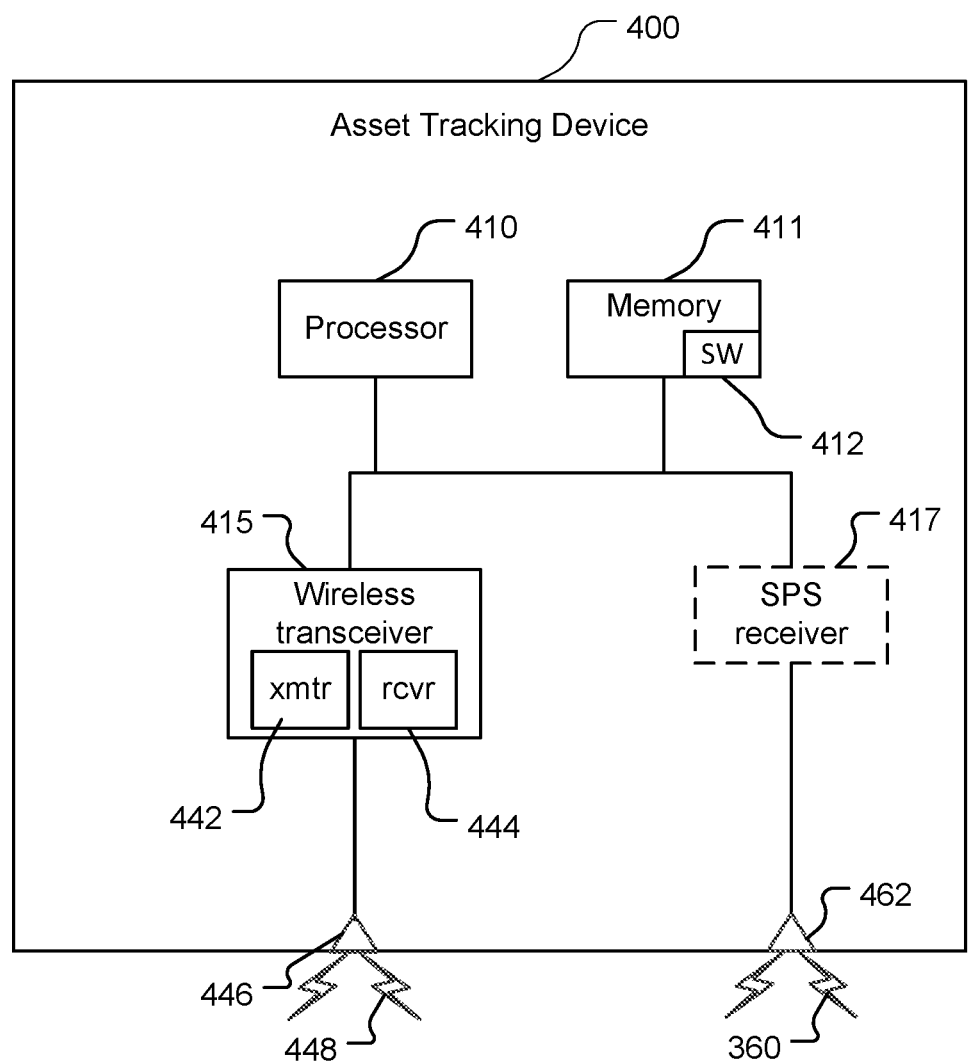
FIG. 4 is a block diagram of components of an example asset tracking device.

Referring also to FIG. 4, an example of an asset tracking device 400 such as an asset tag, key fob, TV remote, security system (e.g., vehicle, commercial, etc.), or other device configured to send and receive RF transmissions. The asset tracking device comprises a computing platform including a processor 410, memory 411 including software (SW) 412, a wireless transceiver 415, and (optionally) an SPS receiver 417. The SPS receiver 417 may be configured similarly to the SPS receiver 217 to be capable of receiving and acquiring SPS signals 360 via an SPS antenna 462. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The processor 410 may include a memory with stored instructions in addition to and/or instead of the memory 411. Functionality of the processor 410 is discussed more fully below.

The wireless transceiver 415 may be configured to communicate with other devices through wireless connections using RF protocols (e.g., WiFi, BTW, UWB, etc.) protocols. For example, the wireless transceiver 415 may include a transmitter 442 and receiver 444 coupled to one or more antennas 446 for transmitting (e.g., on one or more uplink channels) and/or receiving (e.g., on one or more downlink channels) RF wireless signals 448 and transducing signals from the RF wireless signals 448 to wired (e.g., electrical and/or optical) signals and from wired (e.g., electrical and/or optical) signals to the RF wireless signals 448. In an example, the wireless transceiver 415 may include multiple transmitters that may be discrete components or combined/integrated components, and/or the receiver 444 may include multiple receivers that may be discrete components or combined/integrated components. In an example, the wireless transceiver 415 may be configured to communicate signals according to a variety of radio access technologies (RATs). For example, the wireless transceiver 415 may be also configured to utilize RATs such as IEEE 802.11 (including IEEE 802.11ax/az and 802.11bc), WiFi, WiFi Direct (WiFi-D), Bluetooth®, IEEE 802.15 (UWB), Zigbee etc.

Figure 5:
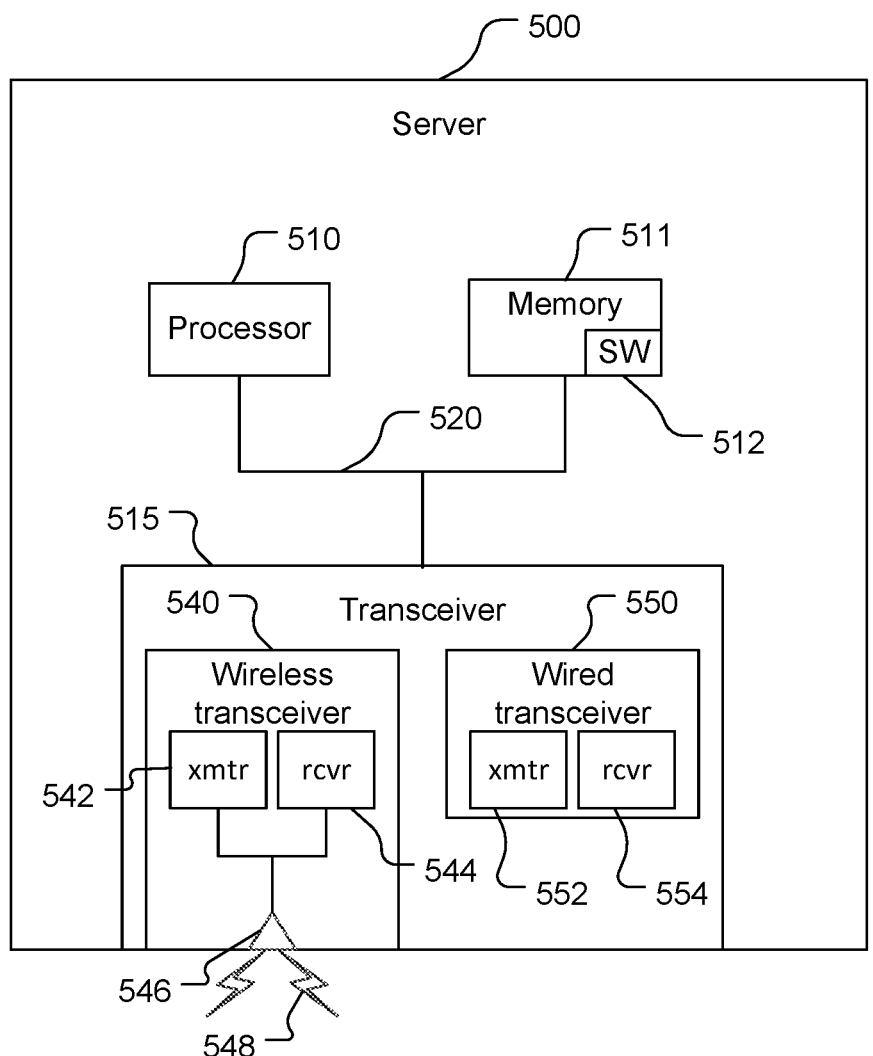
FIG. 5 is a block diagram of components of an example server.

Referring also to FIG. 5, a server 500 may comprise a computing platform including a processor 510, memory 511 including software (SW) 512, and a transceiver 515. The processor 510, the memory 511, and the transceiver 515 may be communicatively coupled to each other by a bus 520 (which may be configured, e.g., for optical and/or electrical communication). One or more of the shown apparatus (e.g., a wireless transceiver) may be omitted from the server 500. The processor 510 may include one or more intelligent hardware devices, e.g., a central processing unit (CPU), a microcontroller, an application specific integrated circuit (ASIC), etc. The processor 510 may comprise multiple processors (e.g., including a general-purpose/application processor, a DSP, a modem processor, a video processor, and/or a sensor processor). The memory 511 may be a non-transitory storage medium that may include random access memory (RAM)), flash memory, disc memory, and/or read-only memory (ROM), etc. The memory 511 may store the software 512 which may be processor-readable, processor-executable software code containing instructions that are configured to, when executed, cause the processor 510 to perform various functions described herein. Alternatively, the software 512 may not be directly executable by the processor 510 but may be configured to cause the processor 510, e.g., when compiled and executed, to perform the functions. The description herein may refer to the processor 510 performing a function, but this includes other implementations such as where the processor 510 executes software and/or firmware. The description herein may refer to the processor 510 performing a function as shorthand for one or more of the processors contained in the processor 510 performing the function. The description herein may refer to the server 500 performing a function as shorthand for one or more appropriate components of the server 500 performing the function. The processor 510 may include a memory with stored instructions in addition to and/or instead of the memory 511. Functionality of the processor 510 is discussed more fully below.

The transceiver 515 may include a wireless transceiver 540 and/or a wired transceiver 550 configured to communicate with other devices through wireless connections and wired connections, respectively. For example, the wireless transceiver 540 may include a wireless transmitter 542 and a wireless receiver 544 coupled to one or more antennas 546 for transmitting (e.g., on one or more downlink channels) and/or receiving (e.g., on one or more uplink channels) wireless signals 548 and transducing signals from the wireless signals 548 to wired (e.g., electrical and/or optical) signals and from wired (e.g., electrical and/or optical) signals to the wireless signals 548. Thus, the wireless transmitter 542 may include multiple transmitters that may be discrete components or combined/integrated components, and/or the wireless receiver 544 may include multiple receivers that may be discrete components or combined/integrated components. The wireless transceiver 540 may be configured to communicate signals (e.g., with the APs, UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 550 may include a wired transmitter 552 and a wired receiver 554 configured for wired communication with other network entities. The wired transmitter 552 may include multiple transmitters that may be discrete components or combined/integrated components, and/or the wired receiver 554 may include multiple receivers that may be discrete components or combined/integrated components. The wired transceiver 550 may be configured, e.g., for optical communication and/or electrical communication.

The description herein may refer to the processor 510 performing a function, but this includes other implementations such as where the processor 510 executes software (stored in the memory 511) and/or firmware. The description herein may refer to the server 500 performing a function as shorthand for one or more appropriate components (e.g., the processor 510 and the memory 511) of the server 500 performing the function. The configuration of the server 500 shown in FIG. 5 is an example and not limiting of the disclosure, including the claims, and other configurations may be used.

Figure 6:
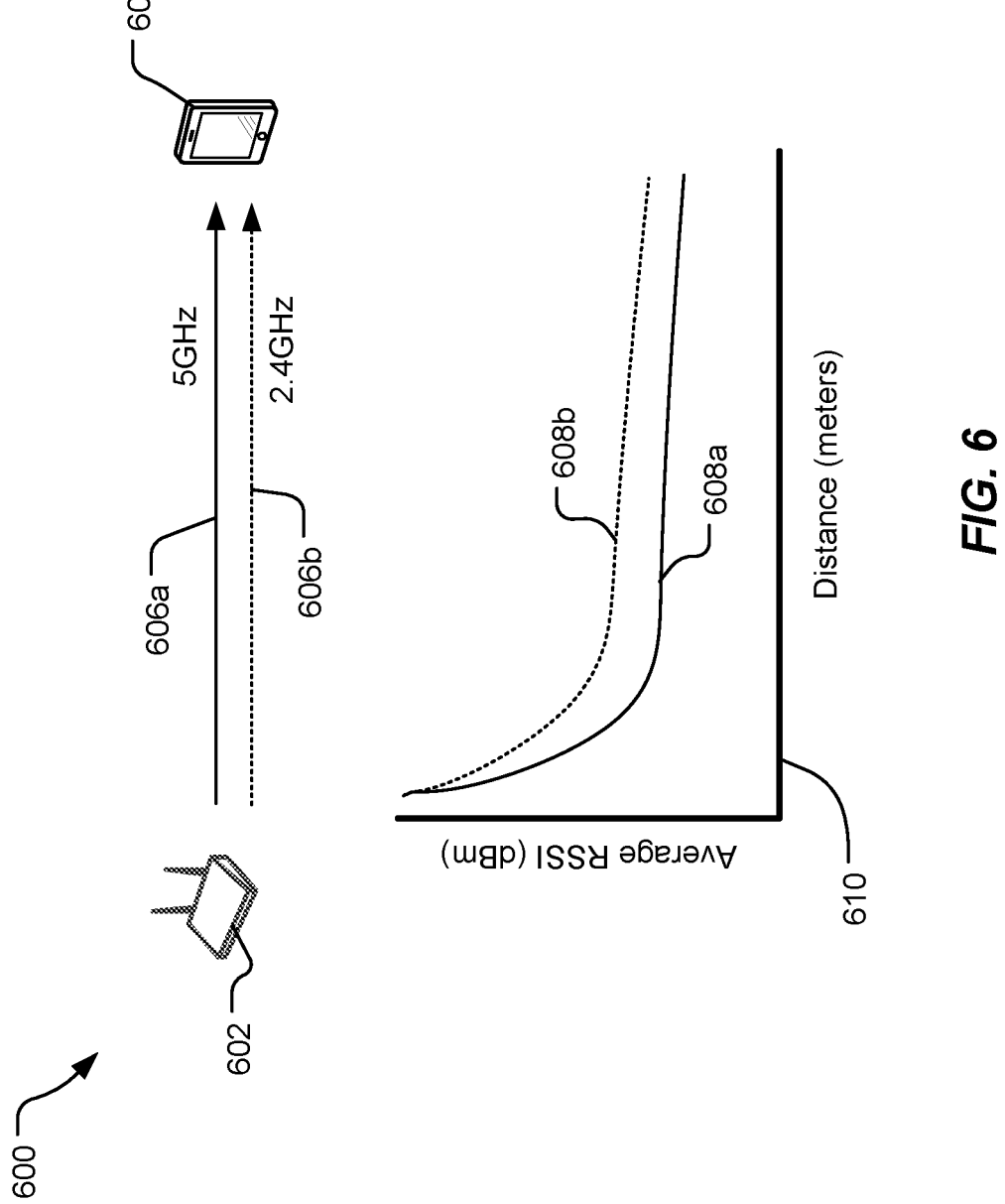
FIG. 6 is a diagram of determining a distance based on example signal strength measurements.

Referring to FIG. 6, a diagram 600 of determining a distance based on example signal strength measurements is shown. The diagram 600 includes an AP 602 and a UE 604 as example wireless nodes. The AP 602 may be configured to transmit signals, such as beacon signals, on one or more channels. For example, a first signal 606a may be transmitted in a 5 GHz band and a second signal 606b may be transmitted in a 2.4 GHz band. The 5 GHz and 2.4 GHz bands are examples, and not limitations as other channels and frequencies may be used. Signal strength measurements, such as RSSI, may be associated with signal attenuation such that smaller the RSSI value, the less the attenuation. RSSI based ranging may utilize different models to correlate a RSSI measurement value with a distance value. Some models may be based on theoretical and/or actual path loss measurements. For example, one or more models may be used to generate distance curves such as depicted in a graph 610. The distance curves may be used to determine a distance between stations based on an RSSI measurement. In operation, however, different signals which are transmitted over different channels may undergo different levels of attenuation and the associated RSSI perceived by a measuring device may be non-uniform. For example, a first distance curve 608a may be associated with the first signal 606a (e.g., 5 GHZ), and a second distance curve 608b may be associated with the second signal 606b. Multiple measurements may be obtained and reported by either the AP 602 and the UE 604 and an average value (or median) of the measurements may be used. Trilateration (or multilateration) techniques may be used with RSSI measurements to obtain a position estimate of a wireless node, such as the UE 604. Specifically, the position estimate may be based on the known positions of multiple stations, and the measured distances to those stations.

Figure 7A:
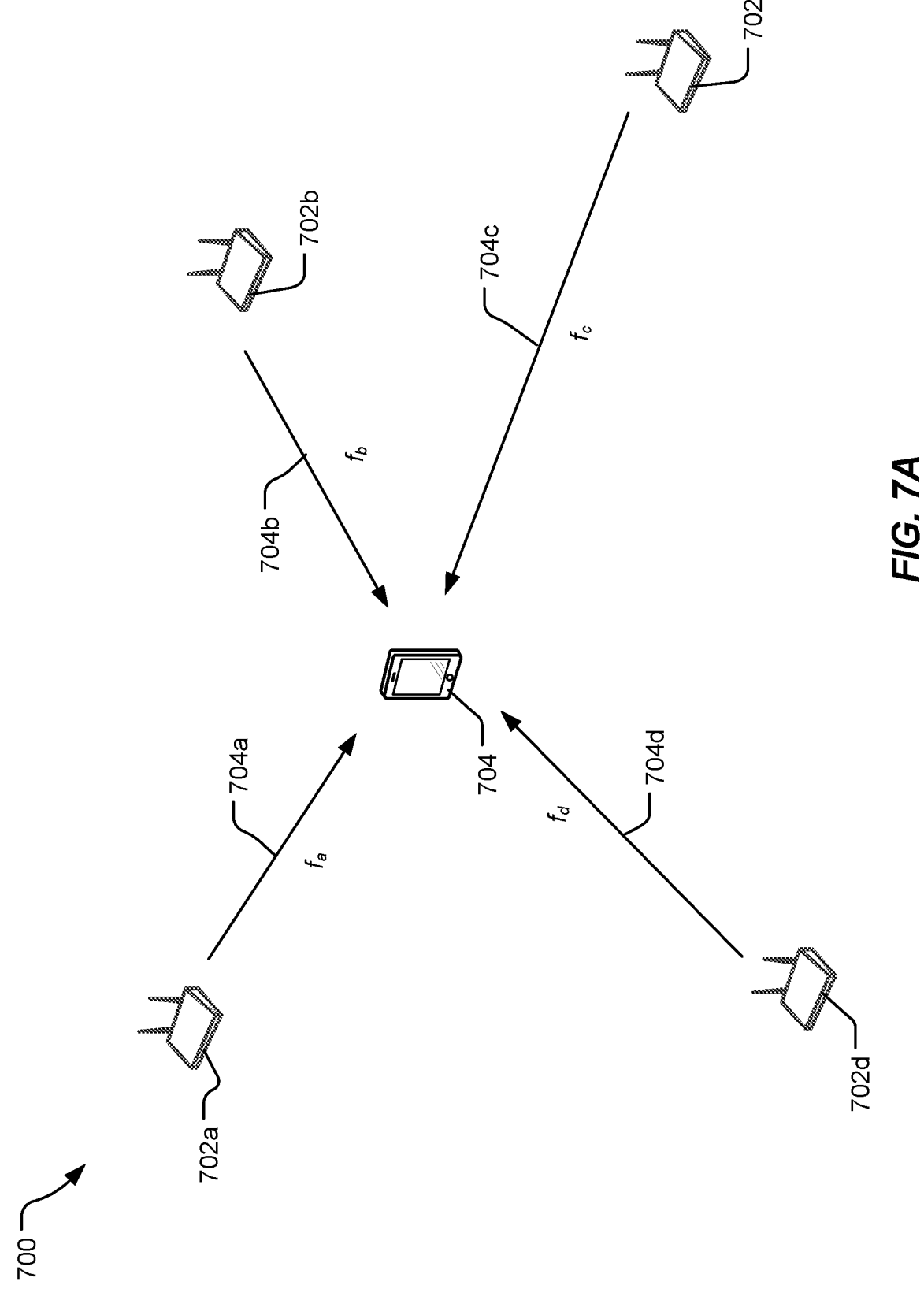
FIG. 7A is a diagram of an example procedure for determining an estimated position based on multiple signal strength measurements.

Referring to FIG. 7A, a diagram of an example procedure for determining an estimated position based on multiple signal strength measurements is shown. The diagram 700 includes a plurality of wireless nodes such as a first AP 702*a*, a second AP 702*b*, a third AP 702*c*, a fourth AP 704*d*, and a UE 704. The APs 702*a-d* and the UE 704 may be configured to transmit beacons and/or to obtain RSSI measurements based on the transmitted beacons. In an example, the first AP 702*a* may broadcast a first beacon signal 704*a*, the second AP 702*b* may broadcast a second beacon signal 704*b*, the third AP 702*c* may broadcast a third beacon signal 704*c*, and the fourth AP 702*d* may broadcast a fourth beacon signal 704*d*. The beacon signals 704*a-d* may be different reference signals and may utilize different bands, channels or frequencies. The beacon signals 704*a-d* which are transmitted over different channels may undergo different levels of attenuation, and the RSSI values perceived by the UE 704 may be non-uniform. This non-uniformity may decrease the accuracy of position estimates for the UE 704. The impact of the non-uniformity may be mitigated by applying offset values to the RSSI values. In an example, the offset values may be based on the respective frequencies or channels of the beacon signals 704*a-d*.

In operation, in an example, the UE 704 may be configure to measure a set of RSSI values corresponding to a set of positioning reference signals, such as the beacon signals 704*a-d*, over a corresponding set of channels (carrier frequencies) and to select a RSSI offset value to be applied to the measured RSSI (i.e., New RSSI=Measured RSSI+Offset). In an example, the RSSI offset values may be based on the corresponding carrier frequencies of the beacon signals 704*a-c*. The offset values may be based on other parameters, such as coarse position information for the UE 704 and/or the APs 702*a-d*. The UE 704 (or a network entity) may be configured to estimate a position of the UE 704 based on the new RSSI values (i.e., with the offset applied to the measured RSSI value).

Figure 7B:
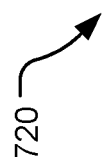
FIG. 7B is a table of example signal strength offsets based on frequency or channel information.

In an example, the RSSI offset values may be based on the frequency (channel) of the transmitted reference signal. Referring to FIG. 7B, a table 720 of example signal strength offset values based on frequency or channel information is shown. The structure of the table 720 is an example, and not a limitation. The table 720 may include a first field 722 associated with different frequencies or channels, and a second field 724 including the corresponding offset values. In an example, the first field 722 may indicate respective frequency bands of the reference signals (e.g., 2.4 GHz band, 5 GHz band, etc.). Different techniques may be implemented to compute the offset values in the second field 724. In an example, an offset value may be based on a free-space path loss formula:

$$\text{Offset}_n = 20 * \log\left(\frac{f_n(\text{GHz})}{\text{Median}(f_k)\text{ across all }k\text{ measurements}}\right) \quad (1)$$

The UE 704 may be configured to select a median carrier frequency across a given set of 'k' beacons and apply a RSSI offset value to each of the measured RSSIs. This technique emulates a scenario where each of the beacon signals 704*a-d* are transmitted over the same median carrier frequency.

In an example, the offset values may be based on statistical channel models. For example, standard models such as those established by industry standards (e.g., 3GPP, IEEE, etc.) may be used to calculate an offset value as a function of the carrier frequency of the current beacon and the median carrier frequency of all the beacons under consideration. In an example, the offset values may be based on a path loss as per a derived model. For example, the offset values may be specified based on prior field measurements and provided to the UE 704 as assistance data. In an example, the table 720 may be represented in a data structure included in the assistance data. The offset values may be based on other parameters.

Figure 8A:
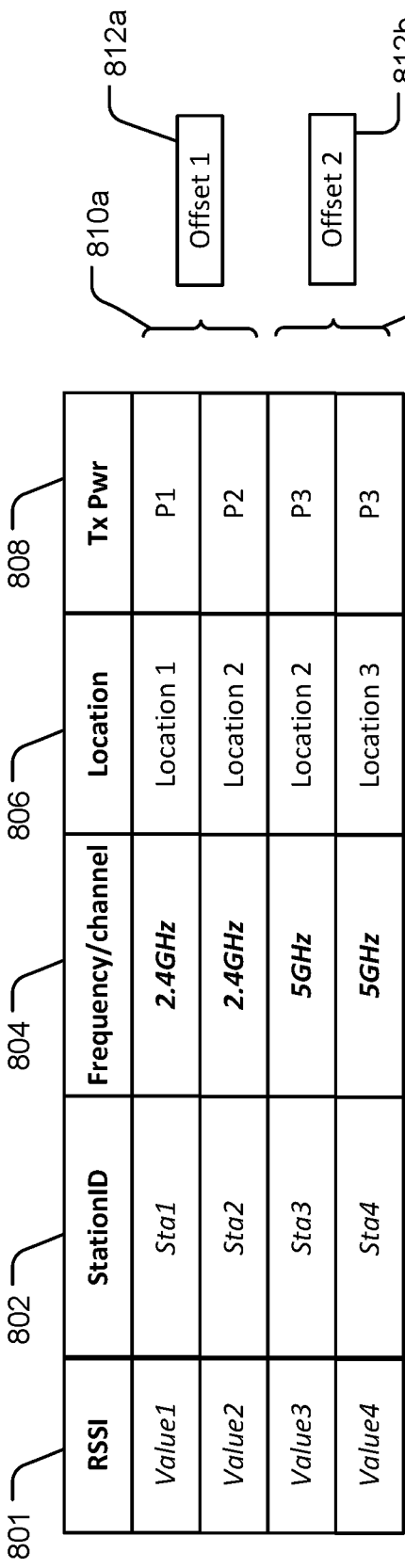
FIGS. 8A-8C include example grouping schemes for determining a signal strength offset.
Figure 8B:
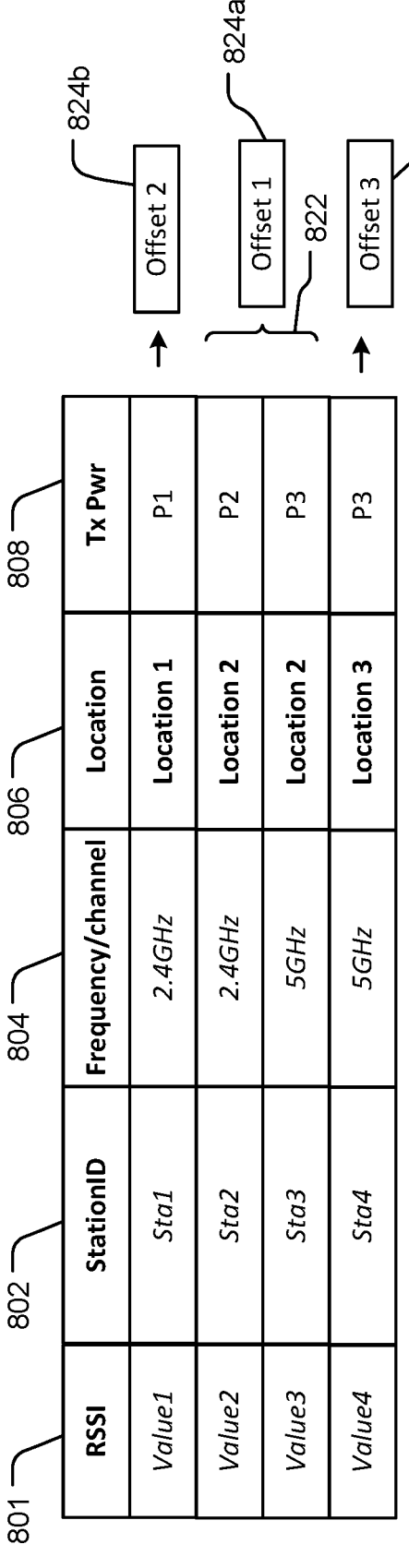
Figure 8C:
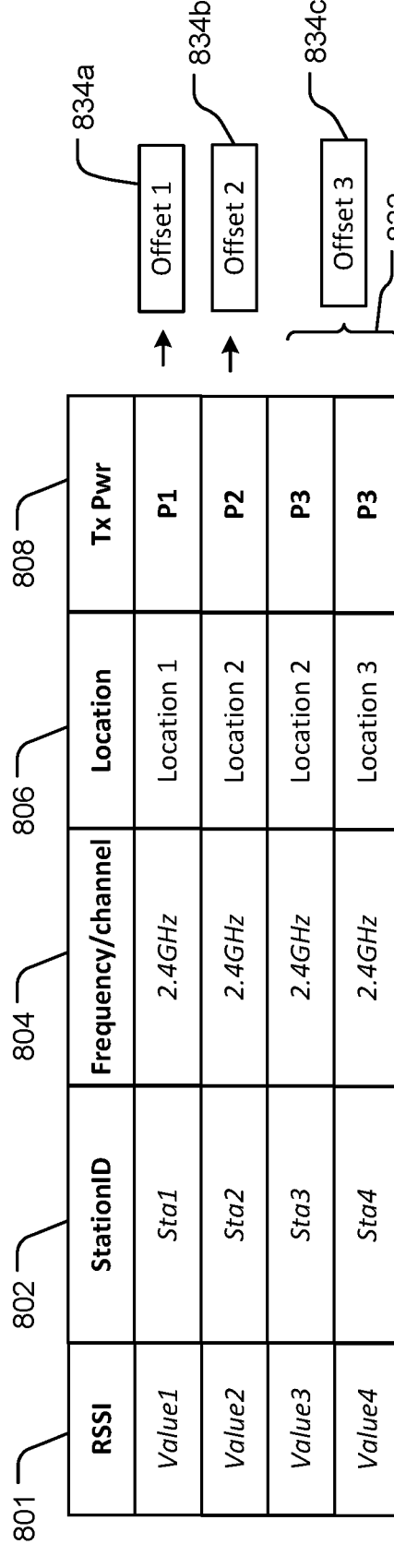

Referring to FIGS. 8A-8C, example group schemes for determining a signal strength offset are shown. In an example, the topology of APs inside a building and their capability information may be utilized in determining offset values. The capability information may include location information (e.g., estimated locations in a location server, locations based on crowdsourced data, etc.), list of carrier frequencies over which the reference signals (or beacons) may be transmitted, and/or the transmit power of the reference signals (or beacons).

In an example, referring to FIG. 8A, the offset values may be based on grouping reference signals based on a carrier frequency. A first example table 800 may include a RSSI measurement value field 801, a station ID field 802, a frequency/channel field 804, a location field 806 and a transmit power field 808. The structure and fields in the tables in FIGS. 8A-8C are examples, and not limitations, as other data structures and fields may be used. In operation, a set of RSSI values 801 corresponding to a set of received beacon frames may be measured and each measured RSSI value may be associated with a carrier frequency. The RSSI values maybe categorize into two or more groups, based on the corresponding carrier frequency. For example, as indicated in the table 800, the offset values may be based on grouping the carrier frequency. A first group 810*a* may be based on the 2.4 GHz band and a second group 810*b* may be based on the 5 GHz band. A first offset value 812*a* may be applied to RSSI measurement values for signals in the first group 810*a*, and a second offset value 812*b* may be applied to RSSI values for signals in the second group 810*b*. A position estimate may be computed based on the new RSSI values (i.e., with respective offsets applied). In an example, if the ratio of the size of a first group (e.g., the first group 810*a*) to another second group (e.g., the second group 810*b*) exceeds a certain threshold, a RSSI offset value associated with the first group may be applied to the RSSI values from the first group, and the RSSI measurements for the other groups may have no offsets applied.

Referring to FIG. 8B, a grouping scheme may be based on the locations of wireless nodes and/or the associated coverage areas. The UE 704 may be configured to measure a set of RSSI values corresponding to a set of received beacon frames, each of which may be associated with an AP with a known (may be a noisy estimate) location, and a carrier frequency. As indicated in a second example table 820, the UE 704 may be configured to categorize a set of RSSI values 801 into two or more groups, based on the locations of the APs (e.g., a location field 806). For example, a third group 822 may be generated based on the proximity of the locations of two or more APs. The RSSI values 801 measured from the stations in the third group 822 may be modified by a common offset value, such as the third offset value 824*a*. Other RSSI values may be modified by other offset values, such as a fourth offset value 824*b* and a fifth offset value 824*c*, respectively. In an example, some RSSI values may not be modified by offset values. An offset value may be assigned to an AP which is identified as a high-visibility AP (e.g., an AP whose measurements may be received across wide coverage areas as a result of being in a favorable location for providing coverage, such as in the center of the store). A high visibility AP may be a group of one.

Referring to FIG. 8C, a grouping scheme may be based on a transmitted power field 808 associated with a RSSI value 801. The UE 704 may be configured to receive power indication information for each of the APs and may group stations based on the transmit power for the reference signals. As indicated in a third example table 830, the UE 704 may be configured to categorize a set of RSSI values 801 into two or more groups, based on the transmit power field 808. For example, a fourth group 832 may be generated based on the transmit power associated with the RSSI values, and a sixth offset value 834c may be applied to the RSSI values. Other transmit power values may have other offsets, such as a seventh offset value 834a and an eighth offset value 834b as indicated in FIG. 8C. In an example, if the difference in transmit power of an AP from a first group and the median (or mean) transmit power of APs from a second group exceeds a certain threshold, then the UE 704 may be configured to select a RSSI offset value to be applied to the RSSI values from the first group.

The grouping schemes in FIGS. 8A-8C are examples, and not limitations, as offset values may be assigned based on other parameters associated with wireless nodes in a network, and/or the respective reference signals transmitted by the wireless nodes. In an example, offset values may be associated with receiver capabilities. For example, the manufacturers make and model of the UE 704 may impact the RSSI measurements (e.g., due to different antenna configurations, different receiver sensitivities, etc.), and RSSI offset values may be associated with different UE configurations, along with other parameters such as described in FIGS. 8A-8C.

Figure 9A:
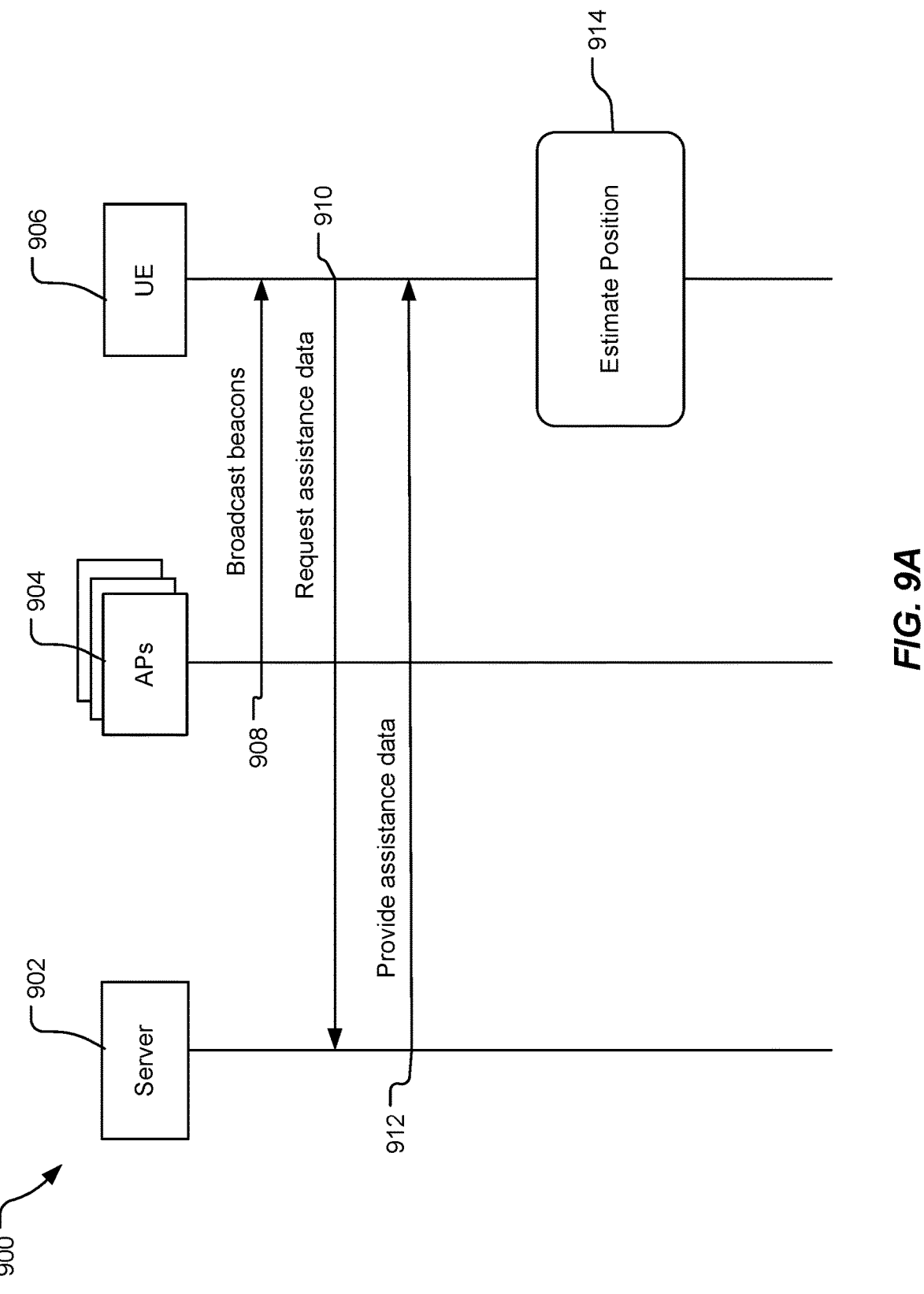
FIGS. 9A-9B are example message flows for determining a position estimate based at least in part on signal strength offset information.
Figure 9B:
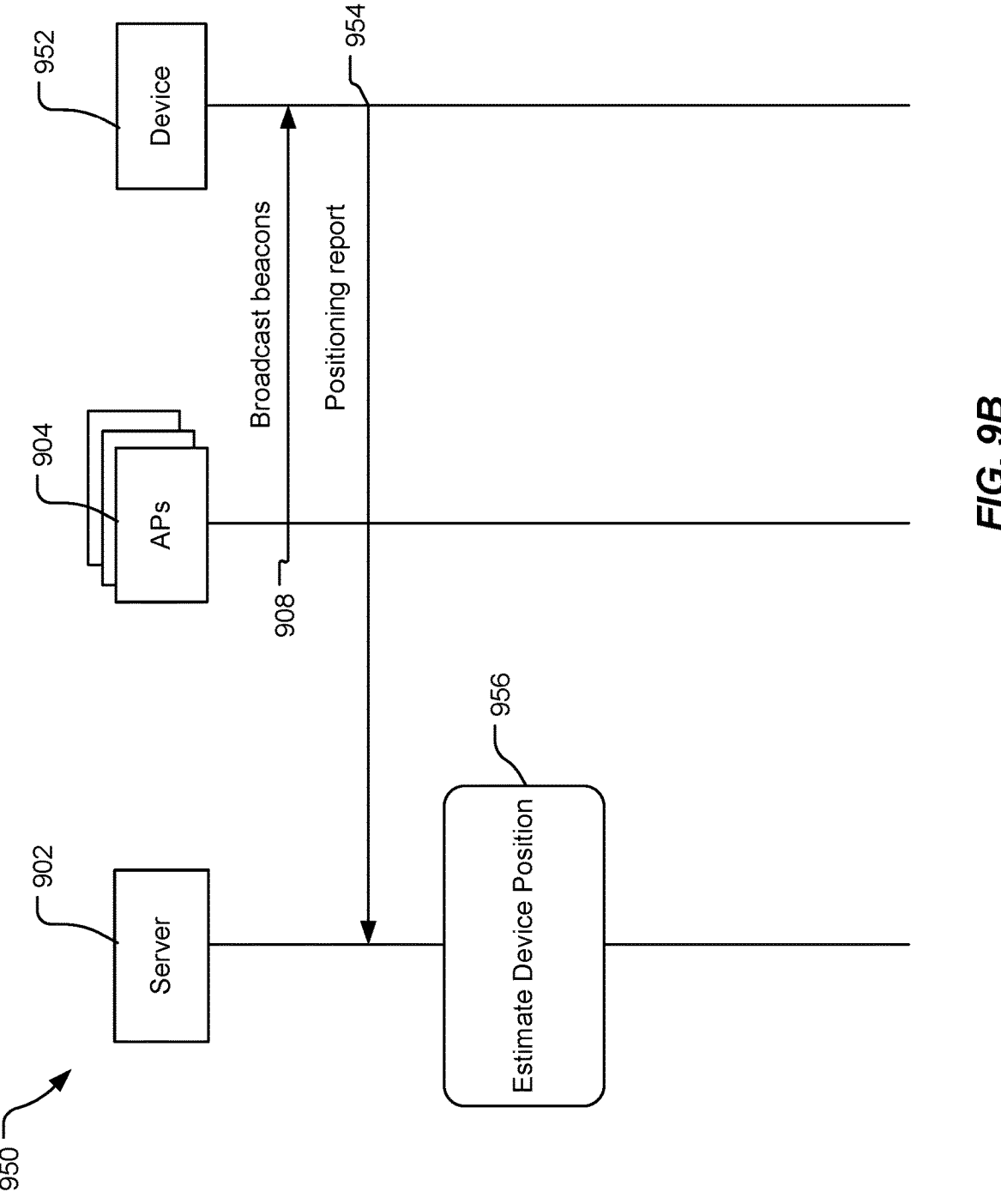

Referring to FIGS. 9A and 9B, example message flows for determining a position estimate based at least in part on signal strength offset information are shown. A first example message flow 900 includes a server 902, multiple wireless nodes such as multiple APs 904 configured to transmit positioning signals, and a UE 906. The number and configurations of the wireless nodes in the message flow 900 are examples and not limitations as other network configurations with different wireless nodes may utilize the message flow 900. The message flow 900 may be utilized for device based positioning, such as indoor navigation use cases where the UE 906 may be configured to determine a position estimate based on received beacons transmitted by the APs 904. In an example, one or more of the APs 904 may be configured to broadcast beacons 908 which are received by the UE 906. The UE 906 may provide one or more request assistance data messages 910 to the server 902. The request assistance data messages 910 may include RSSI measurement information based on the received broadcast beacons 908. The RSSI measurement information may include a set of RSSI measurements, the corresponding set of carrier frequencies, the corresponding set of AP identifiers (such as MAC address, SSID), the corresponding set of transmit power being used by AP (if available in the AP's beacon), and the corresponding set of AP locations (if available in the AP's beacon). Other information available from the measured beacons may also be included in the one or more request assistance data messages 910.

The server 902 may be configured to provide assistance data 912 to the UE 906 based at least in part on receiving the request assistance messages. In an example, the assistance data 912 may include one or more RSSI offset values associated with the RSSI measurements. The assistance data 912 may include formulations to enable the UE 906 to compute one or more RSSI offset values. For example, the assistance data 912 may include a threshold value regarding size ratios between different AP groups (e.g., when the size ratio between groups is above the threshold value, a RSSI offset value is applied to each RSSI value in the larger group). The assistance data 912 may include a threshold value associated with differences in transmit power (e.g., when the difference in transmit power of a first group of APs exceeds the transmit power of a second group of APs by the threshold value, a RSSI offset value is applied to each RSSI value in the first group). The assistance data 912 may include indications of any high-visibility APs. The assistance data 912 may include other information to assist the UE 906 in performing positioning calculations. At stage 914, the UE 906 may be configured to apply RSSI offset information to the measured RSSI values to compute a position estimate. For example, the UE 906 may be configured to perform multilateration based on the RSSI ranges and locations of the APs 904 to estimate a current position.

Referring to FIG. 9B, a second example message flow 950 includes the server 902, the APs 904, and a wireless device 952, such as an asset tracking device 400 or other reduced capability device. The second message flow 950 may be implemented for server based positioning, such as for asset tracking use cases. The device 952 may be configured to receive the beacons 908 broadcast by the one or more APs 904, and then send a positioning report 954 to the server 902. The positioning report 954 may include RSSI measurement information based on the received broadcast beacons 908. The RSSI measurement information may include a set of RSSI measurements, the corresponding set of carrier frequencies, the corresponding set of AP identifiers (such as MAC address, SSID), the corresponding set of transmit power being used by AP (if available in the AP's beacon), and the corresponding set of AP locations (if available in the AP's beacon). Other information available from the measured beacons may also be included in the positioning report 954. At stage 956, the server 902 may be configured to estimate a position for the device 952 based at least in part on the positioning report 954.

Figure 10:
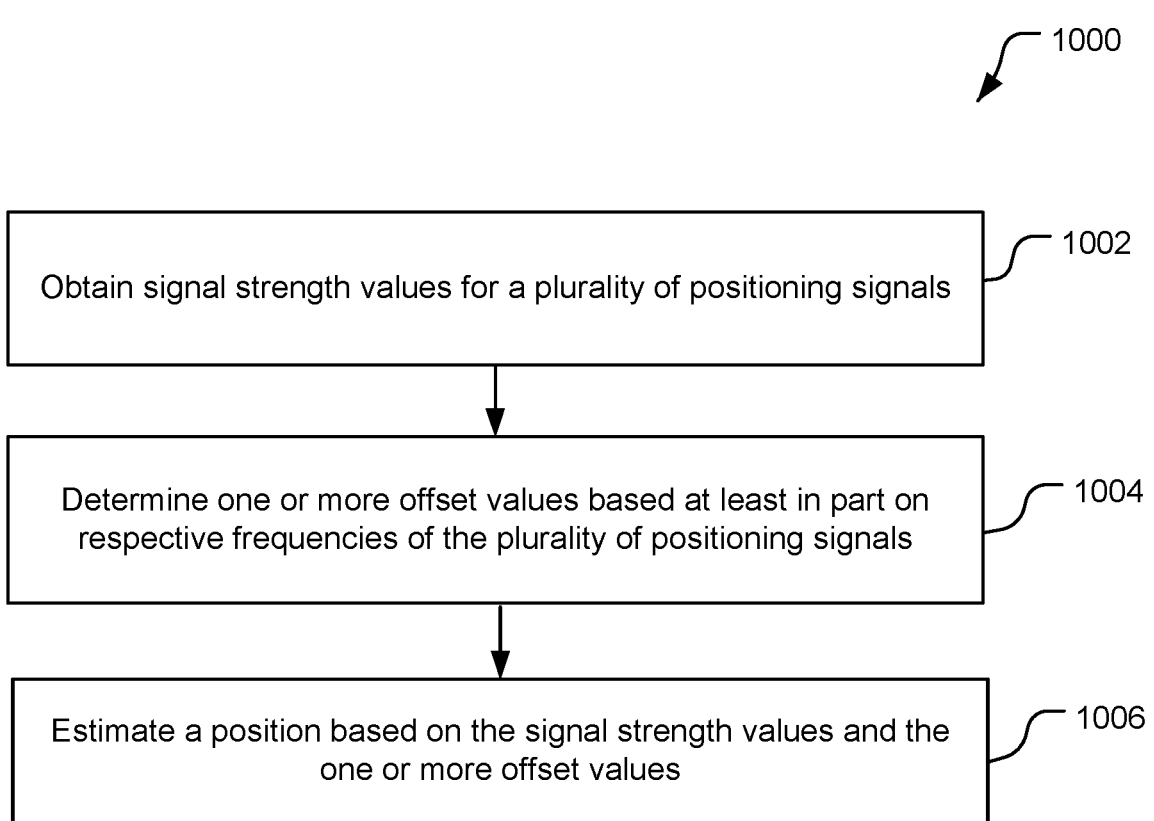
FIG. 10 is a process flow diagram of an example method for estimating a position based on measured signal strength values.

Referring to FIG. 10, with further reference to FIGS. 1-9B, a method 1000 for estimating a position based on measured signal strength values includes the stages shown. The method 1000 is, however, an example and not limiting. The method 1000 may be altered, e.g., by having stages added, removed, rearranged, combined, performed concurrently, and/or having single stages split into multiple stages. The UE 200 or the server 500 may be configured to perform the method 1000. For example, an asset tracking device 400 may be configured to provide signal strength measurements to the server 500, and the server 500 may be configured to estimate a position of the asset tracking device 400.

At stage 1002, the method includes obtaining signal strength values for a plurality of positioning signals. The UE 200, including the transceiver 215 and the processors 210, is a means for obtaining signal strength values. In an example, a network node such as an AP may be configured to transmit reference signals, beacons, or other signals which may be received and measured by other wireless devices in a network. For example, referring to FIG. 9A, the UE 906 may be configured to obtain signal strength values based on the broadcast beacons 908. In an example, referring to FIG. 9B, the server 902 may be configured to obtain the signal strength values in the positioning report 954 from the device 952.

At stage 1004, the method includes determining one or more offset values based at least in part on respective frequencies of the plurality of positioning signals. The UE 200, including the transceiver 215 and the processors 210, is a means for determining the one or more offset values. In an example, the offset values may be included in one or more data structures such as the table 720. The offset values may be based on a free-space path loss formula, such as described in equation (1). The offset values may be based on statistical channel models. The offset values may be based at least in part on respective frequencies of the reference signals, such as described in FIGS. 7A and 7B. The offset values may be based on the respective frequency bands of each of the plurality of positioning signals (e.g., 2.4 GHz band, 5 GHz band, etc.). The offset values may also be based on parameter groupings, such as described in FIGS. 8A-8C. In an example, referring to FIG. 9A, the server 902 may be configured to provide assistance data 912 to the UE 906. The assistance data 912 may include one or more offset values and/or formulations to enable the UE 906 to compute the one or more offset values (e.g., threshold values for AP grouping). In an example, an offset value may be based on the hardware configuration (e.g., antennas, receiver, etc.) of the UE 906 and may be stacked (e.g., combined) with other offset values.

At stage 1006, the method includes estimating a position based on the signal strength values and the one or more offset values. The UE 200, including the processors 210, is a means for estimating the position. Referring to FIG. 9A, the UE 906 may obtain a set of RSSI values corresponding to positioning signals measured at stage 1002. The measured RSSI values may be combined with the one or more offset values determined at stage 1004 to produce a new RSSI value (i.e., New RSSI=Measured RSSI+Offset). The UE 906 may perform trilateration (or multilateration) based on the new RSSI values and the corresponding distances to determine a position estimate. For example, the UE 906 may obtain location information for the APs to compute a position estimate. In an example, the server 902 may be configured to receive a position report from the UE 906, or an asset tracking device 400, and to compute the position estimate.

Referring to FIG. 11, with further reference to FIGS. 1-9B, a method 1100 for characterizing signal strength measurements and determining a position estimate includes the stages shown. The method 1100 is, however, an example and not limiting. The method 1100 may be altered, e.g., by having stages added, removed, rearranged, combined, performed concurrently, and/or having single stages split into multiple stages.

At stage 1102, the method includes measuring signal strength values for a plurality of positioning signals. The UE 200, including the transceiver 215 and the processors 210, is a means for measuring signal strength values. In an example, a network node such as an AP may be configured to transmit reference signals, beacons, or other signals which may be received and measured by other wireless devices in a network. For example, referring to FIG. 9A, the UE 906 may be configured to obtain RSSI values based on the broadcast beacons 908.

At stage 1104, the method includes characterizing the signal strength values into two or more groups based on one or more parameters associated with the plurality of positioning signals. The UE 200, including the transceiver 215 and the processors 210, is a means for characterizing the signal strength values. In an example, referring to FIGS. 8A-8C, the one or more parameters may be based on capability information associated with the wireless devices and the positioning signals. The capability information may include, for example, location information, carrier frequency information, and/or the transmit power information. Other parameters may also be used to divide the signal strength information into groups.

At stage 1106, the method includes determining respective offset values for one or more of the groups. The UE 200, including the processors 210, is a means for determining the offset value. The offset value may be based on a band, frequency and/or channel associated with a group and included in one or more data structures such as the table 720. The offset values may be based on free-space path loss formulas and/or statistical channel models and applied based on the parameter groupings. In an example, assistance data 912 may include grouping information and associated offset values and/or formulations to enable the UE 906 to compute one or more offset values based on the groupings. In an example, configuration information associated with the receive chain(s) in UE 200 may be used to augment the offset values. For example, manufacturers make and model information may be associated with receiver offset values to be applied to the measured signals.

At stage 1108, the method includes modifying the signal strength values in one or more of the groups with the respective offset values. The UE 200, including the processors 210, is a means for modifying the signal strength values. The measured signal strength values may be combined with the respective offset values determined at stage 1106 to produce a modified signal strength value (i.e., modified signal strength=Measured signal strength+offset value). An offset value may be applied to each measured value in a group.

At stage 1110, the method includes estimating a position based on the modified signal strength values. The UE 200, including the processors 210, is a means for estimating a position. A UE (or other network resource) may perform trilateration (or multilateration) based in part on the modified signal strength values computed at stage 1108. The UE may obtain location information for the APs to compute a position estimate.

Figure 12:
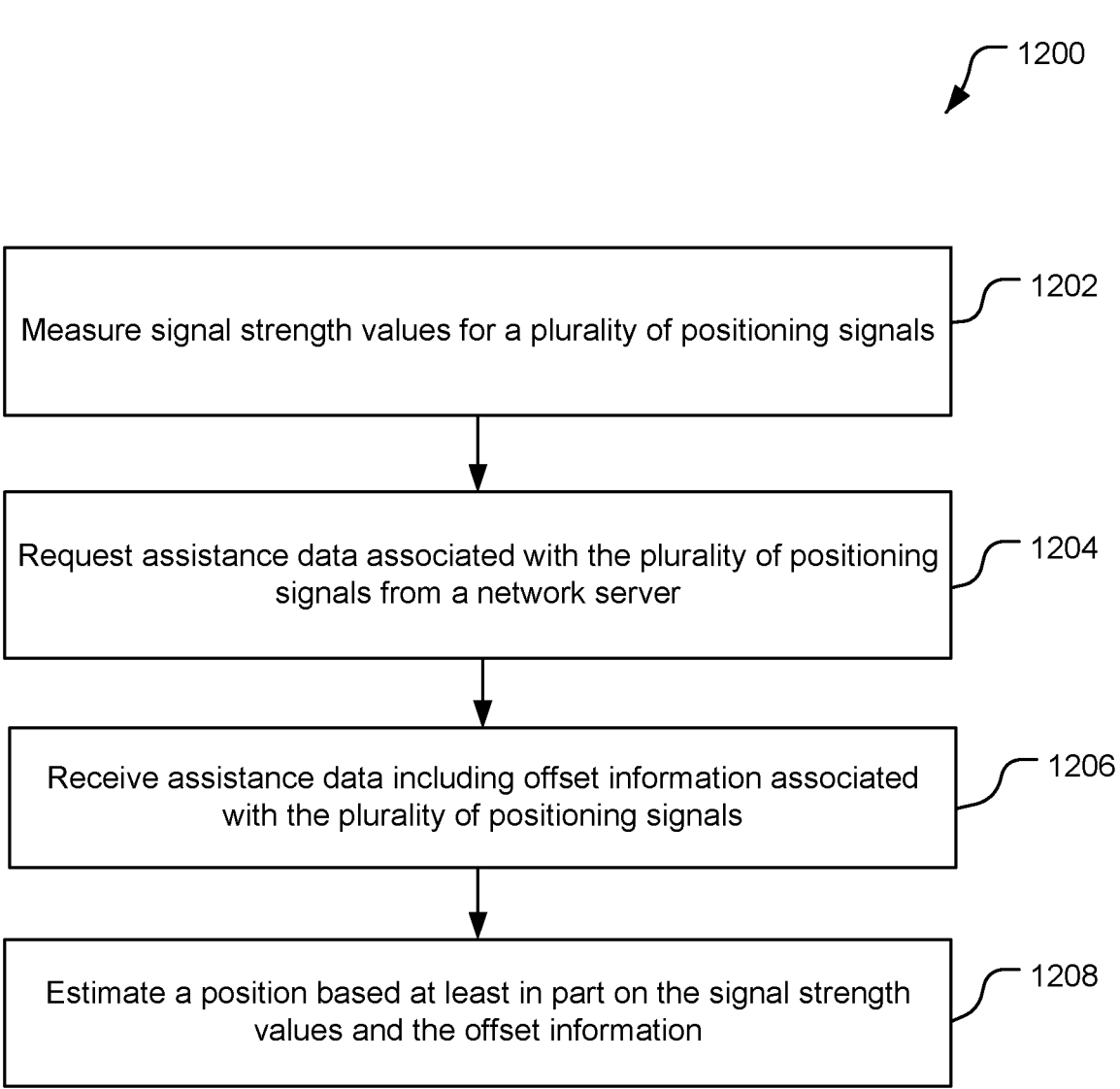
FIG. 12 is a process flow diagram of an example method for utilizing assistance data and measured signal strength values to determine a position estimate.

Referring to FIG. 12, with further reference to FIGS. 1-9B, a method 1200 for utilizing assistance data and measured signal strength values to determine a position estimate includes the stages shown. The method 1200 is, however, an example and not limiting. The method 1200 may be altered, e.g., by having stages added, removed, rearranged, combined, performed concurrently, and/or having single stages split into multiple stages.

At stage 1202, the method includes measuring signal strength values for a plurality of positioning signals. A UE 200, including the transceiver 215 and the processors 210, is a means for measuring signal strength values. In an example, a network node such as an AP may be configured to transmit reference signals, beacons, or other signals which may be received and measured by other wireless devices in a network. For example, referring to FIG. 9A, the UE 906 may be configured to obtain RSSI values based on the broadcast beacons 908.

At stage 1204, the method includes requesting assistance data associated with the plurality of positioning signals from a network server. The UE 200, including the transceiver 215 and the processors 210, is a means for requesting assistance data. In an example, referring to FIG. 9A, the UE 906 may provide one or more request assistance data messages 910 to the server 902. The request assistance data messages 910 may include RSSI measurement information based on the received broadcast beacons 908. The RSSI measurement information may include a set of RSSI measurements, the corresponding set of carrier frequencies, the corresponding set of AP identifiers (such as MAC address, SSID), the corresponding set of transmit power being used by an AP (if available in the AP's beacon), and the corresponding set of AP locations (if available in the AP's beacon). Other information available from the measured beacons may also be included in the one or more request assistance data messages 910.

At stage 1206, the method includes receiving assistance data including offset information associated with the plurality of positioning signals. The UE 200, including the transceiver 215 and the processors 210, is a means for receiving the assistance data. In an example, the offset information may include one or more offset values associated with the signal strength measurements. The offset information may include formulations to enable the UE to compute one or more offset values. For example, the offset information may include a threshold value regarding size ratios between different AP groups (e.g., when the size ratio between groups is above the threshold value, an offset value is applied to each signal strength value in the larger group). The offset information may include a threshold value associated with differences in transmit power (e.g., when the difference in transmit power of a first group of APs exceeds the transmit power of a second group of APs by the threshold value, an offset value may be applied to each signal strength value in the first group). The offset information may include indications of coverage areas for positioning signals (i.e., transmitted by high-visibility APs). The offset information may include other information to assist in obtaining offset values and in performing positioning calculations based on the signal strength measurements obtained at stage 1202. In an example, a receiver offset value associated with the receive chain used to measure the signal strength values may be included in the assistance data. The receiver offset value may be based on calibration information and/or manufacturing information such as make and model identification information.

At stage 1208, the method includes estimating a position based at least in part on the signal strength values and the offset information. The UE 200, including the processors 210, is a means for estimating the position. The UE may be configured to combined with the signal strength values with offset values derived from the offset information. The UE 906 may perform trilateration (or multilateration) based on the combined signal strength values and the corresponding distances to determine a position estimate.

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations. Components, functional or otherwise, shown in the figures and/or discussed herein as being connected or communicating with each other are communicatively coupled unless otherwise noted. That is, they may be directly or indirectly connected to enable communication between them.

As used herein, the singular forms "a," "an," and "the" include the plural forms as well, unless the context clearly indicates otherwise. For example, "a processor" may include one processor or multiple processors. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure). Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or even primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements without departing from the scope of the disclosure.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are described in the following numbered clauses:

Clause 1. A method for estimating a position based on measured signal strength values, comprising: obtaining signal strength values for a plurality of positioning signals; determining one or more offset values based at least in part on respective frequencies of the plurality of positioning signals; and estimating the position based on the signal strength values and the one or more offset values.

Clause 2. The method of clause 1, further comprising: requesting assistance data from a server; and receiving the one or more offset values from the server.

Clause 3. The method of clause 2, wherein requesting the assistance data from the server includes providing the signal strength values to the server.

Clause 4. The method of clause 1, wherein the one or more offset values are based at least in part on respective frequency bands of the plurality of positioning signals.

Clause 5. The method of clause 1, wherein determining the one or more offset values includes calculating a free-space path loss based on a frequency of one or more of the plurality of positioning signals.

Clause 6. The method of clause 1, further comprising grouping the signal strength values based on one or more parameters associated with the plurality of positioning signals, wherein at least one offset value is associated with one group of the signal strength values.

Clause 7. The method of clause 6, wherein the one or more parameters include a frequency of a positioning signal, a location of a station transmitting the positioning signal, a transmission power of the positioning signal, or combinations thereof.

Clause 8. The method of clause 1, wherein the plurality of positioning signals are beacon signals broadcast by one or more access points.

Clause 9. The method of clause 1, wherein obtaining the signal strength values includes receiving a positioning report from a wireless device.

Clause 10. The method of clause 1, wherein the signal strength values are received signal strength indications.

Clause 11. The method of clause 1, further comprising: determining a receiver offset value associated with a receive chain utilized to receive one or more of the plurality of positioning signals; and estimating the position based at least in part on the receiver offset value.

Clause 12. A method for characterizing signal strength measurements and determining a position estimate, comprising: measuring signal strength values for a plurality of positioning signals; characterizing the signal strength values into two or more groups based on one or more parameters associated with the plurality of positioning signals; determining respective offset values for one or more of the groups; modifying the signal strength values in one or more of the groups with the respective offset values; and estimating a position based on the modified signal strength values.

Clause 13. The method of clause 12, further comprising: requesting assistance data from a server; and receiving the respective offset values from the server.

Clause 14. The method of clause 13, wherein requesting the assistance data from the server includes providing the signal strength values to the server.

Clause 15. The method of clause 12, wherein at least one of the respective offset values is based at least in part on a frequency of the plurality of positioning signals in one of the groups.

Clause 16. The method of clause 12, wherein the one or more parameters associated with the plurality of positioning signals includes a coverage area associated with a positioning signal.

Clause 17. The method of clause 12, wherein the one or more parameters include a frequency of a positioning signal, a location of a station transmitting the positioning signal, a transmission power of the positioning signal, or combinations thereof.

Clause 18. The method of clause 12, wherein the plurality of positioning signals are beacon signals broadcast by one or more access points.

Clause 19. The method of clause 12, wherein the signal strength values are received signal strength indications.

Clause 20. The method of clause 12, further comprising: determining a receiver offset value associated with a receive chain utilized to measure one or more of the plurality of positioning signals; and modifying the signal strength values based at least in part on the receiver offset value.

Clause 21. An apparatus, comprising: at least one memory; at least one transceiver; at least one processor communicatively coupled to the at least one memory and the at least one transceiver, and configured to: obtain signal strength values for a plurality of positioning signals; determine one or more offset values based at least in part on respective frequencies of the plurality of positioning signals; and estimate a position based on the signal strength values and the one or more offset values.

Clause 22. The apparatus of clause 21, wherein the at least one processor is further configured to: request assistance data from a server; and receive the one or more offset values from the server.

Clause 23. The apparatus of clause 22, wherein the at least one processor is further configured to provide the signal strength values to the server.

Clause 24. The apparatus of clause 21, wherein the one or more offset values are based at least in part on respective frequency bands of the plurality of positioning signals.

Clause 25. The apparatus of clause 21, wherein the at least one processor is further configured to calculate a free-space path loss based on a frequency of one or more of the plurality of positioning signals.

Clause 26. The apparatus of clause 21, wherein the at least one processor is further configured to group the signal strength values based on one or more parameters associated with the plurality of positioning signals, wherein at least one offset value is associated with one group of the signal strength values.

Clause 27. The apparatus of clause 26, wherein the one or more parameters include a frequency of a positioning signal, a location of a station transmitting the positioning signal, a transmission power of the positioning signal, or combinations thereof.

Clause 28. The apparatus of clause 21, wherein the plurality of positioning signals are beacon signals broadcast by one or more access points.

Clause 29. The apparatus of clause 21, wherein the at least one processor is further configured to receive a positioning report from a wireless device to obtain the signal strength values.

Clause 30. The apparatus of clause 21, wherein the signal strength values are received signal strength indications.

Clause 31. The apparatus of clause 21, wherein the at least on processor is further configured to: determine a receiver offset value associated with a receive chain utilized to receive one or more of the plurality of positioning signals; and estimate the position based at least in part on the receiver offset value.

Clause 32. An apparatus, comprising: at least one memory; at least one transceiver; at least one processor communicatively coupled to the at least one memory and the at least one transceiver, and configured to: measure signal strength values for a plurality of positioning signals; characterize the signal strength values into two or more groups based on one or more parameters associated with the plurality of positioning signals; determine respective offset values for one or more of the groups; modify the signal strength values in one or more of the groups with the respective offset values; and estimate a position based on the modified signal strength values.

Clause 33. The apparatus of clause 32, wherein the at least one processor is further configured to: request assistance data from a server; and receive the respective offset values from the server.

Clause 34. The apparatus of clause 33, wherein the at least one processor is further configured to provide the signal strength values to the server.

Clause 35. The apparatus of clause 32, wherein at least one of the respective offset values is based at least in part on a frequency of the plurality of positioning signals in one of the groups.

Clause 36. The apparatus of clause 32, wherein the one or more parameters associated with the plurality of positioning signals includes a coverage area associated with a positioning signal.

Clause 37. The apparatus of clause 32, wherein the one or more parameters include a frequency of a positioning signal, a location of a station transmitting the positioning signal, a transmission power of the positioning signal, or combinations thereof.

Clause 38. The apparatus of clause 32, wherein the plurality of positioning signals are beacon signals broadcast by one or more access points.

Clause 39. The apparatus of clause 32, wherein the signal strength values are received signal strength indications.

Clause 40. The apparatus of clause 32, wherein the at least one processor is further configured to: determine a receiver offset value associated with a receive chain utilized to measure one or more of the plurality of positioning signals; and modify the signal strength values based at least in part on the receiver offset value.

Clause 41. An apparatus for estimating a position based on measured signal strength values, comprising: means for obtaining signal strength values for a plurality of positioning signals; means for determining one or more offset values based at least in part on respective frequencies of the plurality of positioning signals; and means for estimating the position based on the signal strength values and the one or more offset values.

Clause 42. An apparatus for characterizing signal strength measurements and determining a position estimate, comprising: means for measuring signal strength values for a plurality of positioning signals; means for characterizing the signal strength values into two or more groups based on one or more parameters associated with the plurality of positioning signals; means for determining respective offset values for one or more of the groups; means for modifying the signal strength values in one or more of the groups with the respective offset values; and means for estimating a position based on the modified signal strength values.

Clause 43. A non-transitory processor-readable storage medium comprising processor-readable instructions configured to cause one or more processors to estimate a position based on measured signal strength values, comprising code for: obtaining signal strength values for a plurality of positioning signals; determining one or more offset values based at least in part on respective frequencies of the plurality of positioning signals; and estimating the position based on the signal strength values and the one or more offset values.

Clause 44. A non-transitory processor-readable storage medium comprising processor-readable instructions configured to cause one or more processors to characterize signal strength measurements, and to determine a position estimate, comprising code for: measuring signal strength values for a plurality of positioning signals; characterizing the signal strength values into two or more groups based on one or more parameters associated with the plurality of positioning signals; determining respective offset values for one or more of the groups; modifying the signal strength values in one or more of the groups with the respective offset values; and estimating a position based on the modified signal strength values.

The invention claimed is:

1. A method for estimating a position based on measured signal strength values, comprising:

obtaining signal strength values for a plurality of positioning signals;

determining one or more offset values based at least in part on respective frequencies of the plurality of positioning signals; and estimating the position based on the signal strength values and the one or more offset values.

2. The method of claim 1, further comprising:

requesting assistance data from a server; and receiving the one or more offset values from the server.

3. The method of claim 2, wherein requesting the assistance data from the server includes providing the signal strength values to the server.

4. The method of claim 1, wherein the one or more offset values are based at least in part on respective frequency bands of the plurality of positioning signals.

5. The method of claim 1, wherein determining the one or more offset values includes calculating a free-space path loss based on a frequency of one or more of the plurality of positioning signals.

6. The method of claim 1, further comprising grouping the signal strength values based on one or more parameters associated with the plurality of positioning signals, wherein at least one offset value is associated with one group of the signal strength values.

7. The method of claim 6, wherein the one or more parameters include a frequency of a positioning signal, a location of a station transmitting the positioning signal, a transmission power of the positioning signal, or combinations thereof.

8. The method of claim 1, wherein the plurality of positioning signals are beacon signals broadcast by one or more access points.

9. The method of claim 1, wherein obtaining the signal strength values includes receiving a positioning report from a wireless device.

10. The method of claim 1, wherein the signal strength values are received signal strength indications.

11. The method of claim 1, further comprising:

determining a receiver offset value associated with a receive chain utilized to receive one or more of the plurality of positioning signals; and estimating the position based at least in part on the receiver offset value.

12. A method for characterizing signal strength measurements and determining a position estimate, comprising:

measuring signal strength values for a plurality of positioning signals;

characterizing the signal strength values into two or more groups based on one or more parameters associated with the plurality of positioning signals;

determining respective offset values for one or more of the groups;

modifying the signal strength values in one or more of the groups with the respective offset values; and estimating a position based on the modified signal strength values.

13. The method of claim 12, further comprising:

requesting assistance data from a server; and receiving the respective offset values from the server.

14. The method of claim 13, wherein requesting the assistance data from the server includes providing the signal strength values to the server.

15. The method of claim 12, wherein at least one of the respective offset values is based at least in part on a frequency of the plurality of positioning signals in one of the groups.

16. The method of claim 12, wherein the one or more parameters associated with the plurality of positioning signals includes a coverage area associated with a positioning signal.

17. The method of claim 12, wherein the one or more parameters include a frequency of a positioning signal, a location of a station transmitting the positioning signal, a transmission power of the positioning signal, or combinations thereof.

18. The method of claim 12, wherein the plurality of positioning signals are beacon signals broadcast by one or more access points.

19. The method of claim 12, wherein the signal strength values are received signal strength indications.

20. The method of claim 12, further comprising:

determining a receiver offset value associated with a receive chain utilized to measure one or more of the plurality of positioning signals; and modifying the signal strength values based at least in part on the receiver offset value.

21. An apparatus, comprising:

at least one memory;

at least one transceiver;

at least one processor communicatively coupled to the at least one memory and the at least one transceiver, and configured to:

obtain signal strength values for a plurality of positioning signals;

determine one or more offset values based at least in part on respective frequencies of the plurality of positioning signals; and estimate a position based on the signal strength values and the one or more offset values.

22. The apparatus of claim 21, wherein the at least one processor is further configured to:

request assistance data from a server; and receive the one or more offset values from the server.

23. The apparatus of claim 22, wherein the at least one processor is further configured to provide the signal strength values to the server.

24. The apparatus of claim 21, wherein the at least one processor is further configured to calculate a free-space path loss based on a frequency of one or more of the plurality of positioning signals.

25. The apparatus of claim 21, wherein the at least one processor is further configured to group the signal strength values based on one or more parameters associated with the plurality of positioning signals, wherein at least one offset value is associated with one group of the signal strength values.

26. The apparatus of claim 25, wherein the one or more parameters include a frequency of a positioning signal, a location of a station transmitting the positioning signal, a transmission power of the positioning signal, or combinations thereof.

27. The apparatus of claim 21, wherein the at least on processor is further configured to:

determine a receiver offset value associated with a receive chain utilized to receive one or more of the plurality of positioning signals; and estimate the position based at least in part on the receiver offset value.

28. An apparatus, comprising:

at least one memory;

at least one transceiver;

at least one processor communicatively coupled to the at least one memory and the at least one transceiver, and configured to:

measure signal strength values for a plurality of positioning signals;

characterize the signal strength values into two or more groups based on one or more parameters associated with the plurality of positioning signals;

determine respective offset values for one or more of the groups;

modify the signal strength values in one or more of the groups with the respective offset values; and estimate a position based on the modified signal strength values.

29. The apparatus of claim 28, wherein the at least one processor is further configured to:

request assistance data from a server; and receive the respective offset values from the server.

30. The apparatus of claim 28, wherein the at least one processor is further configured to:

determine a receiver offset value associated with a receive chain utilized to measure one or more of the plurality of positioning signals; and modify the signal strength values based at least in part on the receiver offset value.

\* \* \* \* \*